United States Patent
Cassel

[11] 3,905,623
[45] Sept. 16, 1975

[54] PIPE COUPLING WITH DEFORMABLE OUTER SLEEVE

[76] Inventor: Thomas R. Cassel, 226 Shirley, Birmingham, Mich. 48009

[22] Filed: Apr. 5, 1974

[21] Appl. No.: 458,158

[52] U.S. Cl. .............................. 285/382; 285/417
[51] Int. Cl.² ........................................ F16l 13/14
[58] Field of Search .......... 285/252, 253, 369, 373, 285/417, 419, 420, 407, 236, 382.2, 382.5, 382; 24/280, 279

[56] References Cited
UNITED STATES PATENTS

| 494,996 | 4/1893 | Dwelle | 285/419 |
|---|---|---|---|
| 3,087,221 | 4/1963 | Armstrong | 24/279 |
| 3,572,778 | 3/1971 | Cassel | 285/382 |

Primary Examiner—Andrew V. Kundrat
Attorney, Agent, or Firm—Reising, Ethington, Barnard, Perry and Brooks

[57] ABSTRACT

A pipe coupling is disclosed which utilizes a deformable outer sleeve or pipe which is adapted to be stretched about an inner pipe. The outer sleeve or pipe is formed with a portion of circular or roundish cross-section and a portion defining an inwardly opening, axially extending channel. The inner pipe includes a portion of circular or roundish cross-section and a portion, either integral with or separate from the wall of the inner pipe, which defines an axially extending spline. The inner pipe, including the spline, fits loosely inside the outer pipe with the spline in the channel. Fastener means extending through the wall of the channel draws the wall of the channel into engagement with the spline and stretches the outer pipe around the inner pipe to provide a strong mechanical joint and a fluid tight connection.

14 Claims, 12 Drawing Figures

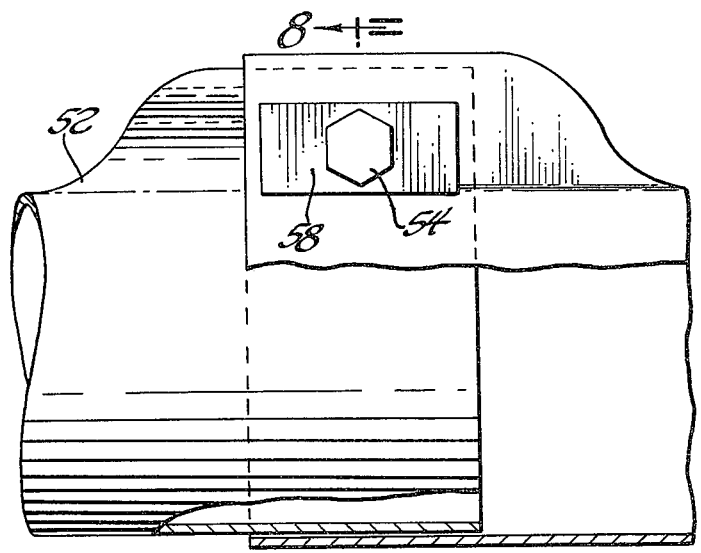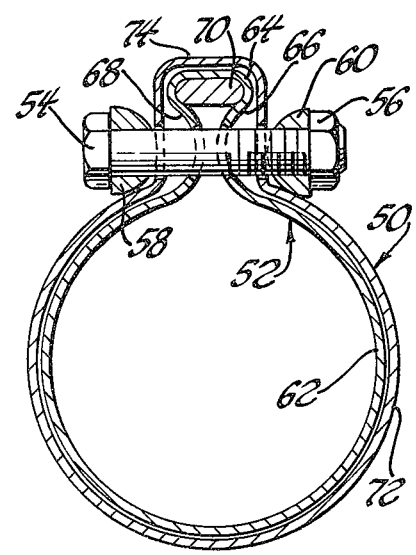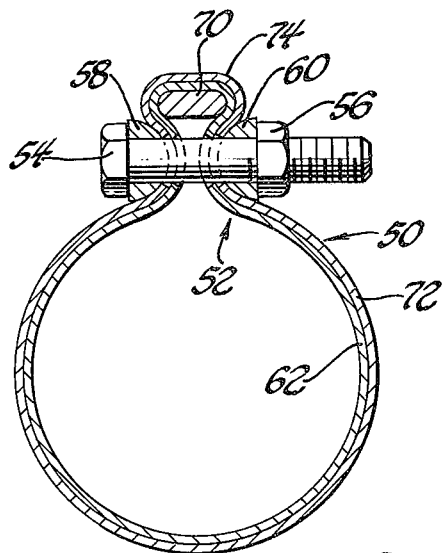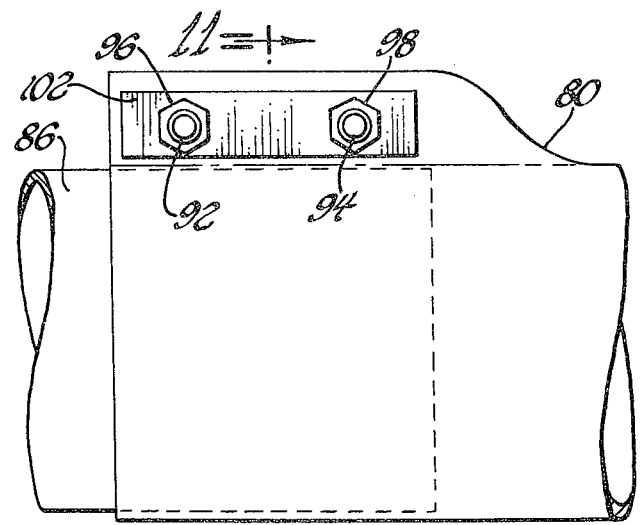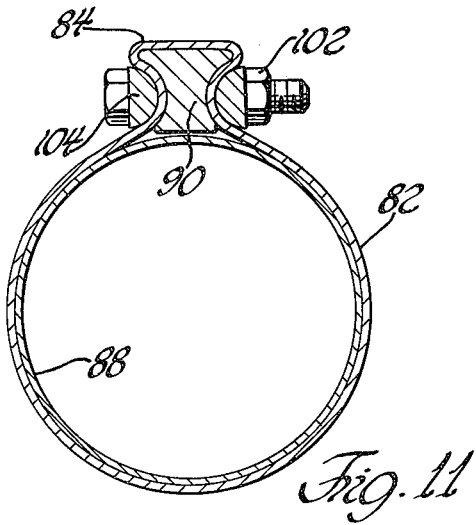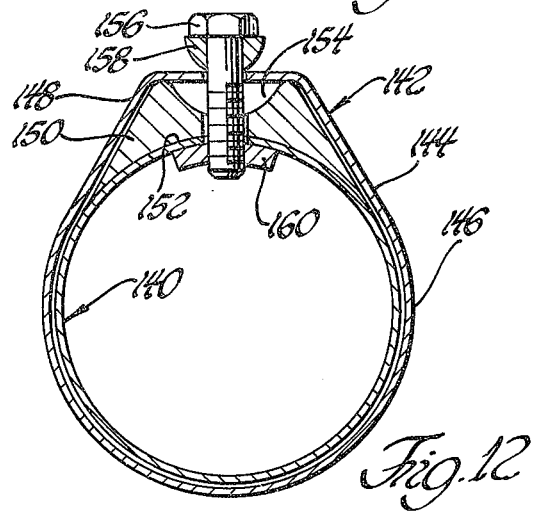

PIPE COUPLING WITH DEFORMABLE OUTER SLEEVE

FIELD OF THE INVENTION

This invention relates to pipe couplings and more particularly to a pipe coupling in which an outer pipe or sleeve is deformed to draw it into tight fitting engagement with an inner pipe. This invention is an improvement upon my pipe coupling disclosed and claimed in U.S. Pat. No. 3,572,778.

There are many applications for pipe couplings, especially in fluid conduits, where it is desired to couple two pipes together in a strong mechanical connection with a substantially fluid tight seal; it is especially desirable to provide such a coupling without the interposition of any flow obstruction within the conduit. The present invention is adapted to provide such a coupling for a wide range of fluid conduit applications. The invention is also useful for joining members other than pipes; for example, it may be employed for joining a pipe to a rod and for joining two rods together.

A principal application of this invention, and the one for which the invention was especially developed, is that of joining together two pipes of a vehicle exhaust system. In such an application, mechanical strength of the coupling and the fluid tightness of the coupling are of paramount importance. Ease of installation and servicing, as well as low cost, are also required in such applications. Because of the relatively high temperatures and mechanical stresses which occur in vehicle exhaust systems, the coupling must be fabricated of suitable metals, such as an appropriate grade of steel. In some applications, such as heavy duty truck exhaust systems, the coupling must join relatively large diameter flexible metal hose with a rigid metal pipe.

Other applications of the invention may include joining of fluid conduits, such as are employed for conveying liquids. Such conduits may be of relatively small diameter as in the case of water pipes and the pipes may be constructed of metal or plastic material. Also, the invention is applicable to the joining of relatively large diameter pipes such as drainage and sewage tile which may be constructed of plastic or clay materials.

The invention is also useful with pipes which are utilized as structural members, as in the case of scaffolds and the like, where a mechanically strong coupling is required and which may be readily assembled and disassembled.

THE PRIOR ART

As stated above, this invention is an improvement upon my previous invention as set forth in U.S. Pat. No. 3,572,778 and, as such, overcomes certain disadvantages of the pipe coupling set forth in said patent. The pipe coupling of my previous patent is of the type which comprises an outer pipe and an inner pipe extending into an end portion of the outer pipe with an end portion of the inner pipe having a peripheral length on the outer surface which is greater than the peripheral length of the opposed inner surface on the end portion of the outer pipe. Force applying means, suitably in the form of a bolt and nut, are adapted to act between the pipe ends for deforming the pipe ends to change the cross-sectional dimensions thereof and produce a close fitting engagement wherein the outer pipe end is stretched over the inner pipe end with the pipe ends in tensile and compressive stress respectively.

Such a pipe coupling produces an exceedingly strong mechanical joint and a good fluid seal so that it is admirably suited to use in joining vehicle exhaust pipes. This coupling, as set forth in my aforementioned patent, utilizes a telescopic connection of the two pipes to be joined and requires an inward deformation in at least one of the pipes. This requires a preforming operation on the pipes which it is desired to avoid. Futher, this coupling results in a reduction of the cross-sectional area of the conduit by an obstruction which may be objectionable in some applications.

In my copending patent application U.S. Ser. No. 267,344 for "Pipe Coupling Unit" I have disclosed and claimed a previous improvement with respect to the aforementioned U.S. Pat. No. 3,572,778. That improvement of the copending patent application resides in a pipe coupling unit which obviates the need for preforming the ends of the pipes to be joined while producing a coupling of the type set forth in my U.S. Pat. No. 3,572,778. That improvement is accomplished by means of a separate coupling device, i.e. a device with inner and outer sleeves and fastening means acting therebetween which is adapted to receive the pipe ends to be joined. The coupling device of my copending patent application, however, provides a joint in which the cross-sectional area of the conduit is reduced by inward deformation of the pipes.

Pipe joints for round pipes have long been known in the prior art in a form which does not diminish the cross-sectional area of the conduit. For relatively thin wall pipes (which do not lend themselves to threaded couplings) such prior joints have typically been constructed as butt joints with a clamping sleeve disposed about the abutting pipe ends. Typical of this construction if that shown in the Morris U.S. Pat. No. 2,227,551 in which the clamping sleeve is of split construction with the free edges extending radially outwardly to form flanges which may be joined together by tangentially extending bolts. A similar split sleeve clamp for use in clamping an exhaust pipe to a muffler is disclosed in the Campau U.S. Pat. No. 1,975,925. A difficulty with this type of clamping sleeve, where the sleeve is made of a ductile metal, is that a circumferential gap is left between the flanges of the clamping sleeve which results in a leakage point at the abutment of the pipes or which requires a suitable gasket in that region. In either case, the clamping sleeve does not exert radial pressure over the entire surface extent of the abutting pipe ends. Further, in this type of clamping sleeve, the sleeve can not be drawn with sufficient tensile stress against the inner pipes for a good fluid seal and strong mechanical joint before undue deforming or tearing of the ductile metal of the sleeve. A clamping sleeve or band for exhaust manifold joints, as shown in the Swanson U.S. Pat. No. 3,490,794 provides a flange on the band with a diagonally extending gap which may be substantially closed by tightening the bolts. This joint is adapted especially for joining a soft metal, bellows-type tube with a cast iron pipe end and as a result of tightening the clamping band, both the tube and pipe ends are placed in compression instead of one being stretched about the other to produce a tight seal.

A clamping sleeve for pipes, especially for repair purposes, is shown in the Adams U.S. Pat. No. 2,559,882. A similar clamping sleeve is shown in the Smith U.S. Pat. Nos. 3,088,185 and 3,183,938. The clamping sleeves of these patents utilize a split sleeve having the edges thereof formed as flanges which are engaged by oppositely disposed sets of lugs. The lugs are drawn together by one or more bolts to stretch the sleeve around the pipe. Clamping sleeves of this type tend to produce nonuniform pressure over the surface extent of the pipe, especially in the vicinity of the inner edges of the lugs. Also there is a gap between the sets of lugs which, in the case of joining abutted pipe ends would result in a leakage point. In clamping sleeves of the type set forth in the Smith patents, one of the problems is that large bending stresses are produced in the clamping bolts with the result that the bolt is bent before the desired stress is produced in the sleeve. This arises from the fact that the reaction force of the lug is offset from the pulling force of the bolt with a resulting leverage which tends to bend the bolt and tilt the lug. The tilting action of the lug produces pressure concentration against the wall of the pipe. Heretofore it has been necessary to counteract such bending moments by the use of rather complex lug design or auxiliary torque arms.

BRIEF DESCRIPTION OF THE INVENTION

In accordance with the present invention there is provided a pipe coupling of the clamping sleeve type which produces exceedingly high tensile stress in the clamping sleeve while exerting substantially uniform radial pressure on the encircled pipe which reacts in compressive stress. This is accomplished by stretching the clamping sleeve about the pipe ends to be coupled by means of drawing a portion of the sleeve toward engagement with a reaction member which constitutes a wall-extension sector of the inner pipe ends. The sleeve is elongated by this drawing action and the tensile stress is distributed throughout the clamping sleeve against the reaction of the pipe ends.

The pipe coupling of this invention may take the form of a separate sleeve which is fitted over the ends of the pipes to be joined, such as a butt joint or a telescopic joint; alternatively, the clamping sleeve may be formed in the end of one of the pipes to be joined and the end of the other pipe may be inserted therein.

In accordance with the invention the wall of the outer pipe is of roundish cross-section except for at least one sector which has an increasing radius defining an inwardly opening axially extending channel; the wall of the inner pipe end is also of roundish cross-section except for at least one wall-extension sector which is of increased radius defining a spline portion and the inner pipe end extends into the outer pipe end with the spline portion in the channel in loose fitting engagement when the pipe ends are in a free or unstressed condition. The peripheral length on the inner surface of a cross-section of the channel is less than the peripheral length on the outer surface of a cross-section of the spline portion. Force applying means preferably in the form of a threaded fastener engages the channel wall and when tightened deforms the wall into surface engagement with the spline portion whereby the outer pipe is stretched over the inner pipe.

The invention may be practiced with a continuous sleeve or with a split sleeve. In either case the tensile stress required for stretching the sleeve into engagement with the pipe is produced by a drawing force applied at one or more regions on the sleeve which force is substantially tangential to the curvature of the pipe and the tensile stress is readily distributed throughout the sleeve. This enables extremely high tensile stresses to be produced without rupture or tearing of the sleeve material since no high stress concentrations are produced. The channel and spline may be configured so that no bending stresses are produced in the threaded fasteners. In one embodiment the spline has a single concave outer surface and the bolt axis extending radially, lies in a plane of symmetry with respect to the forces produced by tightening the bolt. In another embodiment the spline is provided with oppositely facing concave surfaces on the sides thereof and encompassed by the channel so that the axes of the bolts extend tangentially on the pipe curvature. The curvature of the concave surfaces and the space members drawn against the channel wall are of such configuration as to substantially avoid any bending stresses in the bolts.

DETAILED DESCRIPTION

A more complete understanding of this invention may be obtained from the detailed description that follows, taken with the accompanying drawings in which:

FIG. 7 is a side elevation view, partially in section, of another modification;

FIG. 8 is a view taken on lines 8—8 of FIG. 7;

FIG. 9 shows the coupling of FIGS. 7 and 8 in tightened condition;

FIG. 10 is a side elevation partially in section of an additional modification of the invention; and FIG. 11 is a view taken on lines 11—11 of FIG. 10 with the parts in tightened condition.

Figure 1:
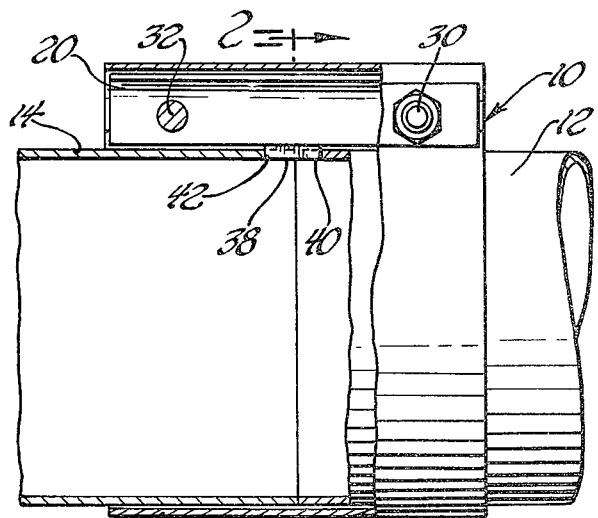
FIG. 1 is an elevation view, partially in section, of the inventive coupling with two pipe ends in abutting relation.

Referring now to the drawings, there is shown an illustrative embodiment of the invention in a pipe coupling especially adapted for fluid conducting pipes. In particular, the invention will be described with reference to an embodiment for vehicle exhaust systems in which the coupling members, including the pipe ends to be coupled, are constructed of metal such as cold rolled steel or stainless steel. Also an embodiment will be described in a pipe coupling especially adapted for conduits for liquid or gas which may take the form of pipes of nonmalleable material, such as clay, asbestos cement or cast iron. It will be appreciated as the description proceeds that the invention is useful in a wide variety of applications wherein it is desired to join two pipe ends or two members with roundish ends, whether tubular or solid and hence whether or not fluid conduction is involved.

Figure 2:
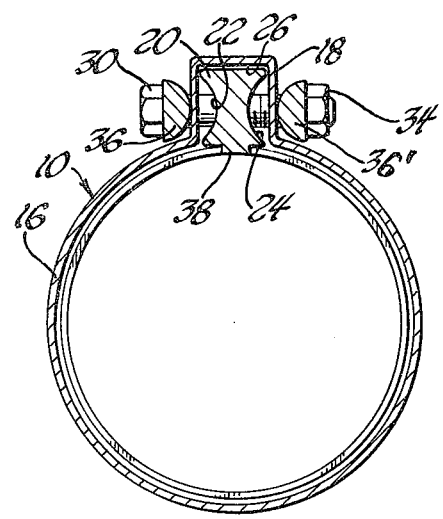
FIG. 2 is a view taken on lines 2—2 of FIG. 1 with the coupling elements in a relaxed or free condition.

Referring now to FIG. 1, the invention is shown in a pipe coupling which is especially adapted for use in a vehicle exhaust system. The coupling comprises a coupling device or unit 10 which encircles the end of a tail pipe 12 and the end of a pipe 14 which is, for example, the stub pipe at the outlet end of a muffler. The pipes 12 and 14 are thin wall steel pipes of circular or roundish (such as slightly oval) cross-section and suitably constructed of a ductile material such as cold rolled steel or stainless steel. The coupling unit 10 comprises a pipe or sleeve 16 which is roundish in cross-section except for a sector which extends radially outwardly to form an inwardly opening radially extending channel 18. The sleeve 16 is constructed of a ductile material, such as cold rolled steel and is suitably formed from thin wall round pipe into the roundish portion and the channel. The pipes 12 and 14 are loosely fitted inside the sleeve 16 and abut each other in the mid-section of the sleeve. A reaction member or spline 20 is disposed within the channel 18 and is seated upon the outer surface of the walls of the pipes 12 and 14. The spline 20 has a surface configuration which forms a continuation of the outer surface of the pipes in cross-section. The spline constitutes a wall-extension sector superimposed upon the walls of the pipes 14 and 12 so that these walls, as viewed in FIGS. 1 and 2, are of roundish cross-section except for the wall-extension sector of increased radius formed by the spline 20. As noted in FIG. 2, the spline 20 is provided with a pair of oppositely facing convex surfaces 22 and 24 at opposite sides thereof and a substantially flat surface 26 at the outer end. The spline 20 fits loosely within the channel 18 and extends as one integral piece substantially throughout the length of the sleeve 16.

The coupling unit is provided with fastening means in the form of a pair of bolts 30 and 32 and respective nuts such as a nut 34 on bolt 30. The side walls of the channel 18 are provided with openings for passage of the bolts 30 and 32 therethrough and the spline 20 is provided with aligned openings for passage of the bolts. An elongated spacer 36 with appropriate openings for the bolts 30 and 32 is disposed between the bolt heads and the outside of the channel 20; similarly, a spacer 36' is disposed between the nuts 34 and the other side of the channel 20. The spacers 36 and 36' have a cross-sectional configuration, approximately semi-circular, which corresponds to the configuration of the concave surfaces 22 and 24 on the spline 20.

For the purpose of orienting or indexing the pipes 12 and 14 relative to each other, as is required in the case of a tailpipe and muffler stub pipe, an indexing key 38 is provided on the bottom of the spline 20. The key 38 is preferably rectangular, and as shown in FIG. 1, an indexing slot 40 is provided in the end of pipe 12 and an indexing slot 42 is provided in the end of pipe 14. Thus the pipes 12 and 14 are oriented properly relative to each other when the pipe ends are positioned within the coupling unit 10 with the key 38 disposed in the slots 40 and 42.

With the pipe coupling, including the coupling unit 10 and the pipes 12 and 14, assembled in the untightened relationship as shown in FIGS. 1 and 2, the coupling is completed by tightening the bolts 30 and 32. As the bolts are tightened down, the spacers 36 and 36' are progressively drawn together against the resistance of the sidewalls of the channel 18. It is noted that in the loose fit condition with the pipe ends (including the sleeve 16) in an unstressed or relaxed condition, the peripheral length on the inner surface of the sleeve 16 including channel 18 is less than the peripheral length on the outer surface of the cross-section of the inner pipes 12 and 14 including the wall-extension thereof provided by the spline 20. It follows that the peripheral length on the inner surface of the cross-section of the channel is less than the peripheral length on the outer surface of the cross-section of the spline, since the peripheral length on the inner surface of the roundish cross-section of the sleeve 16 is obviously greater than the peripheral length on the outer surface of the roundish cross-section of the pipes 12 and 14.

As the tightening of the bolts 30 and 32 progresses, the sidewalls of the channel 18 are drawn inwardly toward the concave surfaces 22 and 24; accordingly, the sleeve 16 in its roundish portion is reduced in radius and the clearance relative to the pipes 12 and 14 diminishes. When the bolts are fully tightened, the spacers 36 and 36' have drawn the sidewalls of th channel 18 inwardly into seating engagement with the convex surfaces of the spline 20. To achieve this relationship the roundish portion of the sleeve 16 and the channel 18 are deformed by tensile stress, within the elastic limit of the material, so that the stress is distributed substantially uniformly throughout the length and circumference of the sleeve. This tensile stress in the sleeve imposes a radial pressure on the walls of the pipes 12 and 14 which places them in a state of compressive stress. In other words, the sleeve 16 is stretched over the pipes 12 and 14. This stretching of the sleeve 16 pulls the spline 20 radially inwardly so that the bottom thereof presses against the walls of the pipes 12 and 14 to exert substantially the same radial pressure as that exerted by the roundish portion of the sleeve 16 on the walls of the pipes.

Figure 3:
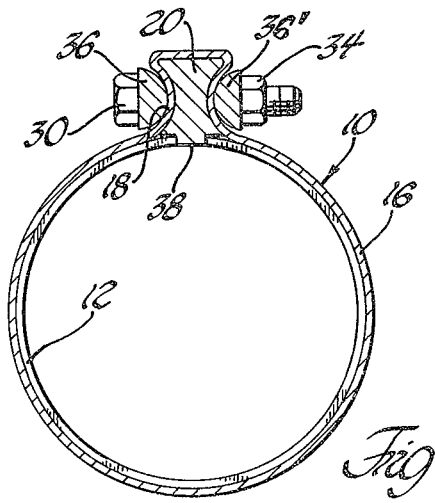
FIG. 3 shows the inventive coupling of FIGS. 1 and 2 with the coupling tightened, i.e. the elements in a stressed condition.

It has been found that the spline 20, constructed as a separate piece, as shown in FIGS. 1, 2 and 3, need not have an arcuate bottom surface conforming to the pipe curvature; instead, as shown in FIG. 2, the spline 20 is provided with a flat bottom surface, except for the key 38. The radial force exerted on the spline 20 by the tension in the sleeve 16 causes a slight flattening of the inner pipes 12 and 14 so that close engagement is obtained clear across the flat bottom surface of the spline, as shown in FIG. 3. Ideally, the lower corners of the spline 20 would be formed as a knife edge to provide perfect continuity between the convex surfaces of the spline and the concave curvature of the surfaces of the inner pipes 12 and 14. However, such a knife edge is not practical in volume manufacture and accordingly the lower corners of the spline are formed as approximately square corners with a very small rise between the flat bottom and the concave surface. Preferably the splines are formed of sintered metal and in this manufacturing technique, the rise between the flat bottom and concave surface can be held to about 15 mils.

With the coupling fully tightened, as shown in FIG. 3, the sleeve 16 provides close fitting surface engagement over an extensive area with the pipes 12 and 14; also the bottom surface of the spline 20 is pressed into close fitting surface engagement with the pipes 12 and 14. Accordingly, a strong mechanical joint is provided with a substantially fluid tight sealing relationship. The only points of leakage are the minute areas at the lower corners or apices of the spline 20. For most exhaust system applications the cross-sectional area of these leakage points is negligible; in other applications a sealing compound may be used if desired.

Figure 4:
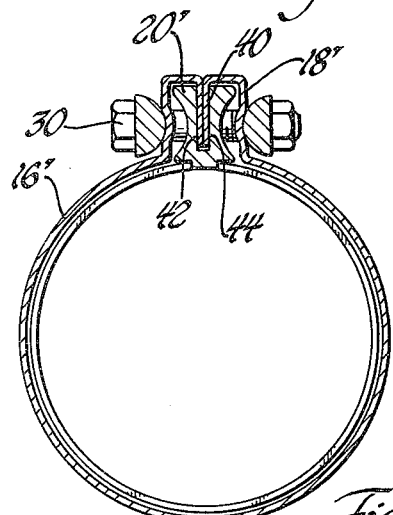
FIG. 4 shows a modification of the inventive coupling.

The embodiment of the invention, as shown in FIG. 4, is the same as that described with reference to FIGS. 1, 2, and 3 except that a split pipe or sleeve 16' is provided. As shown in FIG. 4, the sleeve 16' includes a circular or roundish portion and a channel portion 18'. The spline 20' is provided with a longitudinally extending slot 40 extending throughout the length of the spline. The free ends of the sleeve at the outer wall of the channel 18' are bent radially inwardly to form flanges 42 and 44 which are disposed within the slot 40. To retain the flanges 42 and 40 in the slot during the tightening operation the bolts 30 and 32 extend through openings in the flanges. When the bolts 30 and 32 are tightened in the coupling of FIG. 4 the sidewalls of the channel 18' are drawn inwardly into engagement with the spline 20' and the sleeve 16' is stretched about the pipes 12 and 14 in the same manner as described with reference to FIG. 3.

It is to be noted, with reference to the embodiments of FIGS. 3 and 4 that the completion of the joint by tightening the bolts does not impose appreciable bending stresses on the bolts. This obtains because the force applied by the bolt and the resultant resisting force exerted by the holes of the channel through the spacers lie along the same line, i.e. no couple is produced except that which might arise from nonuniform loading across the surface of the spacers.

Another embodiment of the invention is shown in FIGS. 7, 8 and 9. In this embodiment, one of the pipe ends to be coupled is inserted inside the other and the outer pipe serves as the clamping sleeve. The coupling comprises an outer pipe 50 an inner pipe 52 and fastening means including a bolt 54, nut 56 and spacers 58 and 60. As shown in FIG. 8, wherein the coupling members are loosely assembled, the inner pipe 52 includes a portion 62 which is circular or roundish in cross-section and includes a wall-extension sector or portion of increased radius defining a spline 64. The spline 64 extends longitudinally of the pipe 52 for a distance equal approximately to the diameter of the circular portion 62. The spline 64 is provided with oppositely facing concave surfaces 66 and 68. A reinforcement member on bar 70 is disposed between the walls of the spline 64 at the upper extremity thereof to provide greater rigidity as a reaction member.

The outer pipe 50 comprises a portion 72 of circular or roundish cross-section with a sector or portion of increased radius which defines an inwardly opening, axially extending channel 74. With the coupling members assembled, as shown in FIG. 8, before the bolt 54 is tightened, the end of the inner pipe 52 extends into the end of the outer pipe 50 with the spline 64 in the channel 74 in loose fitting engagement. As described with reference to the embodiment of FIG. 1, the peripheral length on the inner surface of the cross-section of the channel 74 is less than the peripheral length on the outer surface of the cross-section of the spline 64. Accordingly, when the bolt 54 is tightened and the spacer members 58 and 60 deform the walls of the channel 74 into engagement with the concave surfaces 66 and 68 of the spline 64, the outer pipe 50 is stretched about the inner pipe 52. This relationship is shown in FIG. 9 and provides a strong mechanical joint with a fluid tight seal as a result of the tight fitting engagement of the pipes over a wide area.

Another embodiment of the invention is shown in FIGS. 10 and 11 wherein one of the two pipes to be coupled serves as a clamping sleeve and the end of the other pipe is inserted within the sleeve and has a circular or roundish cross-section. This pipe coupling comprises an outer pipe 80 which is provided at one end with a portion 82 of circular or roundish cross-section and with a sector or portion of increased radius defining an inwardly opening, axially extending channel 84. An inner pipe 86 has a portion 88 of circular or roundish cross-section with a separate wall-extension sector or portion of increased radius which forms a spline 90 extending longitudinally of the pipe. The coupling further comprises a pair of bolts 92 and 94 extending through the walls of the channel 84 and through the spline 90. The bolts 92 and 94 are provided with nuts 96 and 98 respectively, and a pair of elongated spacers 102 and 104 are disposed on the bolts from opposite sides of the channel. The inner pipe 86 extends into the end of the outer pipe with the spline 90 in the channel 84 in loose fitting engagement when the pipe ends are in an unstressed condition. The peripheral length on the inner surface of the cross-section of the channel 84 is less than that of the outer surface of the cross-section of the spline 90, as described with reference to FIG. 1. When the bolts 92 and 94 are tightened the sides of the channel 84 are drawn into engagement with the concave surfaces on opposite sides of the spline 90 and the outer pipe 80 is stretched about the inner pipe 86. This relationship produces a strong joint with a good fluid seal, the same as described previously with reference to FIG. 3.

Figure 5:
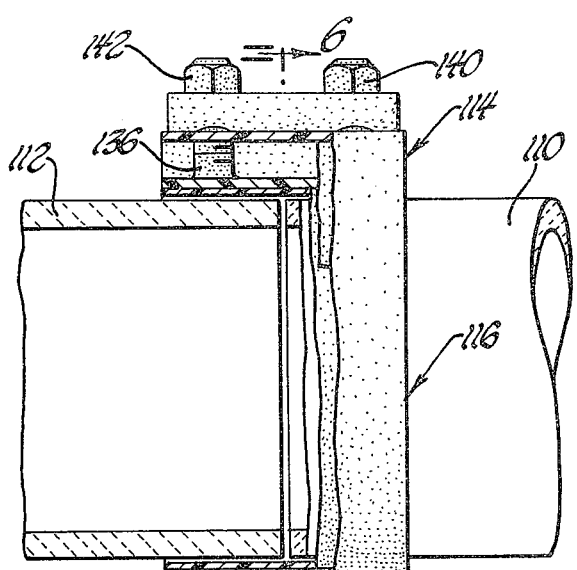
FIG. 5 shows a side elevation view, partially in section, of another modification.
Figure 6:
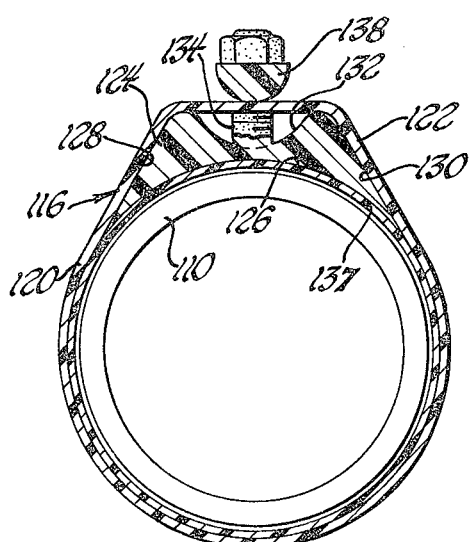
FIG. 6 is a view taken on lines 6—6 of FIG. 5.

Another embodiment of the invention is shown in FIGS. 5 and 6 and differs in several respects from the embodiments previously described. The pipe coupling of this embodiment is suitable for pipes of a wide range of size including those of larger diameter such as six inches or greater. This pipe coupling lends itself to construction from plastic materials such as organic polymeric compositions, as well as ductile metals. The pipes to be coupled may be constructed of metal or plastic or may be of nonmalleable materials, such as clay composition, asbestos cement or cast iron.

In the illustrative embodiment of FIGS. 5 and 6, the coupling comprises first and second clay pipes 110 and 112 with the ends thereof to be joined disposed within a coupling device or unit 114. The pipes 110 and 112 are of circular or roundish cross-section and the ends are in abutting relation near the midsection of the coupling device 114. The coupling device comprises an outer pipe or sleeve 116 which is constructed of high tensile strength plastic, such as nylon, which also exhibits good bending qualities. The sleeve 116 includes a portion 120 or circular or roundish cross-section and a portion or sector of increased radius defining an inwardly opening axially extending channel 122. Each of the pipes 110 and 112 has a portion of circular or roundish cross-section and a wall-extension sector or portion of increased radius which defines a spline 124. The spline 124 has an inner surface 126 of arcuate configuration corresponding to the arcuate surface of the pipe 110. The spline is provided with sloping sidewalls 128 and 130 which extend tangentially from the curve surface of the pipe and terminate in respective shoulders at the outer surface of the spline which is provided with an axially extending concave surface 132. The spline 124 is suitably formed of a molded plastic of high tensile strength, such as nylon. It is preferably formed integrally with a pair of threaded studs 134 and 136 which extend radially outwardly from the concave surface 132. A sealing gasket 137 of rubber or plastic in the form of a sleeve is suitably disposed in lapping relationship over the ends of the pipes 110 and 112 inside the sleeve 116 and the spline 124. The studs 134 and 136 extend through openings in the sleeve 116 and elongated spacer 138 of plastic material having a high compression strength is disposed over the studs outside the wall of the channel 122. A pair of nuts 140 and 142 threadedly engage the studs 134 and 136, respectively, outside the spacer 138. The spacer 138 is provided with a cross-sectional surface configuration which corresponds with the concave surface 132 of the spline. As shown in FIGS. 5 and 6, the ends of the inner pipes 110 and 112 are inserted into the coupling unit 114 and the spline 124 is disposed within the channel 122 in loose fitting engagement with the sleeve 116 in an unstressed condition. The peripheral length on the inner surface of the cross-section of the channel is less than the peripheral length on the outer surface of the cross-section of the spline.

When the nuts 140 and 142 are tightened onto the studs 134 and 136 respectively, the spacer 138 draws the wall of the channel 122 toward engagement with the concave surface 132 of the spline 124. With the nuts fully tightened, the sleeve 116 is held in tensile stress and thus exerts uniform radial pressure against the gasket and walls of the pipes 110 and 112; also the spline exerts a radial pressure upon the gasket and pipes. In effect, the sleeve 116 is stretched around the inner pipes, including the spline and produces close fitting engagement therewith over a large surface area and provides a tight fluid seal.

Another embodiment of the invention is shown in FIG. 12. This embodiment is similar to that of FIGS. 5 and 6 and is especially adapted for coupling steel pipes in a vehicle exhaust system. This coupling comprises first and second aligned steel pipes 140 which have their ends in abutting relation near the midsection of the coupling device 142. The coupling device comprises an outer pipe or sleeve 144 of steel costruction. The sleeve 144 includes a portion 146 of circular or roundish cross section and a portion or sector of increased radius defining an inwardly opening axially extending channnel 148. A spline 150 has an inner surface 152 of arcuate configuration corresponding to the arcuate surface of the pipes 140 and has sloping sidewalls which extend tangentially from the curved surface of the pipes 140. An outer concave surface 154 is provided in the spline 150. Thus the spline has a surface configuration which forms a continuation of the outer surface of the pipes to be joined and constitutes a wall extension sector superimposed upon the walls of the pipes. A pair of bolts 156 (only one shown) are spaced axially along the pipes 140 and the shanks thereof extend respectively through openings in the walls of the pipes adjacent the abutting ends. The bolts 156 carry an elongated spacer 158 on the respective shanks which extend also through respectively openings in the sleeve 146 and the spline 150 to engage the respective nuts 160 which conform to the curvature of the pipes 140.

The coupling unit, as shown in FIG. 12, is shown in loosely assembled relation with the pipes 140. When the bolts 156 are tightened, the spacer 158 draws the wall of the channel portion 148 toward engagement with the concave surface 154 of the spline 150. When the bolts are fully tightened the sleeve 146 is held in tensile stress and thus exerts radial pressure against the walls of the pipes 140 and the spline exerts radial pressure against the walls of the pipes 140. The sleeve 146 is stretched around the pipes 140 and produces a close fitting engagement with the pipes and the spline. This close fitting engagement is effective to produce a very strong mechanical joint; however, the bolts 156 extending through holes in the pipes 140 assures that excessive axial loading on the pipes will not separate them from the coupling unit. Additionally, the bolt holes in the pipes serve as indexing or orienting devices to assure assembly of the pipes in a given relative orientation.

Although the description of this invention has been given with respect to a particular embodiment it is not to be construed in a limiting sense. Many variations and modifications will now occur to those skilled in the art. For a definition of the invention, reference is made to the appended claims.

The embodiments of the present invention in which an exclusive property or privilege is claimed are defined as follows:

1. In a pipe coupling of the type comprising an outer pipe and an inner pipe extending into one end portion of the outer pipe, an end portion of the inner pipe having a peripheral length on the outer surface which is greater than the peripheral length of the opposed inner surface on the end portion of the outer pipe, force applying means adapted to act between the pipe ends for deforming the outer pipe end to change the cross-sectional dimensions thereof and produce a close fitting engagement with the inner pipe end wherein the inner pipe end is in compressive stress and the outer pipe end is in tensile stress, the improvement wherein the wall of said outer pipe end is of roundish cross-section except for at least one sector of increased radius defining an inwardly opening, axially extending channel, the wall of said inner pipe end is of roundish cross-section except for at least one wall-extension sector of increased radius defining a spline portion, said inner pipe end extending into said outer pipe end with said spline portion in said channel in loose fitting engagement with the pipe ends in an unstressed condition, the peripheral length on the inner surface of a cross-section of said channel being less than the peripheral length on the outer surface of a cross-section of said spline portion, said force applying means comprising fastener means having a shank extending through said channel with a movable element on at least one end reacting on said channel whereby tightening of the fastener means draws the wall of the channel toward the spline portion and the outer pipe end is stretched over the inner pipe end.

2. The invention as defined in claim 1 wherein said spline includes concave surfaces disposed face to face, respectively, with the opposed walls of said channel, and wherein said fastener means extends through the opposed walls of said channel and through said spline.

3. The invention as defined in claim 1 wherein said fastener means comprises a bolt extending through said spline and said channel, a shaped spacer member on said bolt, and a nut on said bolt for forcing said spacer member into the wall of said channel against the reaction of said spline whereby the wall of said channel is drawn into engagement with the spline.

4. The invention as defined in claim 1 wherein said spline has a concave outer surface and wherein said fastening means comprises a bolt extending radially through said spline and the outer wall of said channel, a shaped spacer member on the bolt outside said channel and a nut on the bolt outside said spacer member.

5. The invention as defined in claim 1 wherein said spline is formed integrally with the wall of said inner pipe.

6. The invention as defined in claim 5 wherein a reaction member is disposed interiorly of the walls of said spline.

7. The invention as defined in claim 1 including a second inner pipe extending into the other end portion of the outer pipe and being of roundish cross-section except for at least one wall extension sector of increased radius defining a second spline portion, said second inner pipe end extending into said other outer pipe end with said spline portion in said channel in loose fitting engagement with the other outer pipe end and the second inner pipe end in an unstressed condition, the peripheral length on the inner surface of a cross-section of said channel being less than the peripheral length on the outer surface of a cross-section of said second spline portion, said force applying means comprising fastener means engaging said channel opposite both of the aforementioned spline portions and, when tightened, deforming the wall of the channel into surface engagement with both of the aforesaid spline portions whereby the outer pipe end is stretched over both of the aforementioned inner pipe ends.

8. The invention as defined in claim 7 wherein said spline portions comprise an elongated reaction block of one piece construction separated from the part of said inner pipe which is of roundish cross-section.

9. The invention as defined in claim 8 wherein said fastener means includes at least one bolt extending through said channel and said spline and including a nut on said bolt.

10. The invention as defined in claim 9 wherein said elongated reaction block includes concave surfaces disposed fact to face, respectively, with the opposed walls of said channel, and wherein said bolt extends through the opposed walls of said channel and through said spline.

11. The invention as defined in claim 10 wherein said concave surfaces have a curvature which in cross-section thereof extends tangentially of the curvature of said inner pipe at the point of intersection of said curvature and the surface of said pipe.

12. The invention as defined in claim 11 wherein said curvature of said concave surface is approximately circular.

13. The invention as defined in claim 10 wherein said outer pipe is an axially split sleeve, said axially elongated reaction block defining an axially extending slot in the outer surface thereof, the free ends of said split sleeve being oppositely disposed at the outer wall of said channel, said ends being extended radially inwardly into said slot.

14. The invention as defined in claim 13 wherein said bolt extends through the sidewalls of said channel and through the free ends of said sleeve lying in said slot.

* * * * *

UNITED STATES PATENT OFFICE
CERTIFICATE OF CORRECTION

Patent No. 3,905,623                     Dated September 16, 1975

Inventor(s) Thomas R. Cassel

It is certified that error appears in the above-identified patent and that said Letters Patent are hereby corrected as shown below:

Column 2, line 64, (Specification page 4, line 20) "2,559,882" should be --2,599,882--.

Column 4, line 13, (Specification page 6, line 31) "space" should be --spacer--.

Column 6, line 12, (Specification page 10, line 26) "th" should be --the--.

Column 7, line 37, (Specification page 13, line 12) "on" should be --or--.

Column 8, line 46, (Specification page 15, line 16) first instance "or" should be --of--.

Column 11, line 28 (Claim 8, line 3) "separated" should be --separate--.

Column 12, line 7, (Claim 10, line 3) "fact" should be --face--.

Signed and Sealed this tenth Day of February 1976

[SEAL]

Attest:

RUTH C. MASON
Attesting Officer

C. MARSHALL DANN
Commissioner of Patents and Trademarks